Nov. 30, 1965        E. V. HARDWAY, JR        3,221,160
LOGARITHMIC CONVERTER
Filed April 27, 1962                4 Sheets-Sheet 1

INVENTOR.
Edward V. Hardway, Jr.
BY
ATTORNEYS

Fig. 4

Edward V. Hardway, Jr.
INVENTOR.

3,221,160
LOGARITHMIC CONVERTER
Edward V. Hardway, Jr., Houston, Tex., assignor to Houston Instrument Corporation, Houston, Tex.
Filed Apr. 27, 1962, Ser. No. 190,565
11 Claims. (Cl. 235—197)

This invention relates to a logarithmic converter for obtaining linear or angular motion or an electrical signal precisely proportional to the logarithm of the ratio of an input voltage to a reference voltage and particularly, to such a converter which is usable over wide ranges of amplitude and frequency. In another of its aspects, it relates to a converter in which the antilogarithm of a linear or angular displacement input is precisely proportional to the ratio of the input to the output voltage.

The logarithm of voltage ratios, normally expressed in decibels (or twenty times the logarithm to the base ten of the ratios), are commonly used in computation since the complex functions can be readily multiplied or divided by simple addition or subtraction of the logarithms. Quantities are frequently converted to logarithms in computing devices for the same purpose. Moreover, a wide range of amplitude may be displayed graphically with equal percentage readibility at any point on the graph. Instrument dials and voltmeter scales are often made approximately logarithmically divided for the same reason. Nearly all data pertaining to acoustics or the frequency response of loud speakers, microphones, filters, amplifiers, etc., are presented in terms of decibels versus log frequency (i.e., with both scales logarithmic).

Numerous devices or apparatus have been suggested for automatically indicating or plotting the voltage ratios in decibels. Some vacuum tube voltmeters employ moving coil panel type microammeters with specially shaped air gaps to permit almost equally spaced decibels scale divisions, but they cover only one decade and require frequent scale switching. In the present state of the art, the highest accuracy claimed for such A.C. vacuum tube voltmeters is 1%. Other devices are limited in accuracy by the means utilized for logarithmic conversion. Logarithmic non-linear potentiometers, if single-turn and card-wound, involve the use of varying wire size and spacing and have poor accuracy in terms of voltage conformity. Moreover, one of the prime problems of achieving high accuracy with one-turn potentiometers wound on non-linear cards is both the dimensional accuracy of the card and the resolution limited by the number of turns. Multi-turn, non-linear potentiometers require varying wire sizes, taps and padding resistors, often determined by a computer, to accommodate a large range of input voltages. These are normally wound on a helical metallic mandrel and are very limited in their high frequency response. Grounding the mandrel causes the capacity between the winding and mandrel to shunt high frequency current in the high resistance portion of the winding. An ungrounded mandrel assumes a potential much higher than that portion of the winding where the resistance varies slowly with wiper position and causes extremely large errors at and between the padded taps. High accuracy, even at low frequencies, is very costly to obtain if the potentiometer is to work over a large range of amplitude. For example, the rate of change of resistance with angular or linear motion must vary 1000:1 on the same winding to cover a range of sixty decibels. An error tolerance of one percent of full scale is equivalent to an error of one thousand percent at the other end. A reasonable fixed percentage error of the input at any level is very difficult to obtain with presently known techniques for manufacturing non-linear or logarithmic potentiometers.

Both the semiconductor and vacuum tube diodes under certain conditions of operation will produce an output signal proportional to the logarithm of the input signal. Such devices are in commercial use in computers and in logarithmic converters used in conjunction with X–Y and strip chart recorders. Such devices are, however, limited in amplitude range, are subject to variations with temperature, are difficult to adjust and do not have precisely defined end points in their range of operation. Associated circuits required for their use are complex and difficult to stabilize. Their usage as logarithmic converters has, therefore, been very limited.

It is therefore a general object of this invention to provide a logarithmic converter which is relatively simple to construct, is substantially drift-free even under wide variations of ambient conditions and yet which is very accurate over wide ranges of amplitude and frequency.

Another object is to provide a precise means for obtaining the logarithm of an input voltage relative to a known or unknown reference voltage over a wide range of amplitude and frequency and in which the error, expressed as a percentage of the input voltage, is substantially independent of the level of the input voltage.

Another object is to provide a logarithmic converter in which a standard linear potentiometer can be used, thereby eliminating the need for special and expensive non-linear potentiometers, while at the same time achieving greater accuracy than has been possible in the past with non-linear potentiometers.

Another object of the invention is to provide such a converter having a broad decibel range and employing transformer windings connected in such a way as to reduce substantially the number of turns in such windings in order to achieve the broad decibel range.

Another object is to provide a logarithmic converter having an output which is precisely proportional to the logarithm of an input voltage relative to a known or unknown reference voltage, which output can be in the form of either a mechanical motion or positioning or an electrical signal.

Another object is to provide a logarithmic converter in combination with a thermal converter or suitable detector and means for indicating on a logarithmic scale to make possible precise A.C. voltage measurements in accuracy ranges well below 0.5%.

Other objects, advantages and features of the invention will be apparent to one skilled in the art upon consideration of the specification, the appended claims and the attached drawings wherein:

In accordance with this invention, a linear potentiometer is provided with a plurality of taps, which are preferably equally spaced apart, corresponding to a predetermined decibel spacing. An input voltage, the log of which, relative to a reference voltage, is to be determined, is then divided into a plurality of sub or stepped voltages such that the logarithm of the difference between these stepped voltages corresponds to the decibel spacing desired on the taps of the potentiometer. These stepped voltages are then applied to the taps on the potentiometer so that the input voltage is, in effect, spread logarithmically along the taps of the potentiometer and each tap is clamped at the proper voltage. The wiper position or wiper voltage at each tap point will then be proportional to the logarithm of the voltage ratio of the voltage input to the dividing means to the output voltage at the particular tap as determined by the voltage dividing means. Since the taps are at some finite decibel spacing apart, movement of the potentiometer wiper between the taps will interpolate voltage levels as they exist between the taps.

It has been discovered that the interpolation by the wiper between taps can be made logarithmic rather than linear by using a loading resistor electrically connected between the wiper and a fixed voltage point such as ground and that the corrective action of the loading resistor is equally effective between all taps on the potentiometer and that its value need not be changed as the wiper moves from one end of the potentiometer to the other.

Without the loading resistor, it has been found that the wiper will interpolate arithmetically, thereby causing substantial errors in decibel reading. For example, if the desired range to be covered is seventy-two decibels and the decibel spacing on the potentiometer between taps is three decibels, the potentiometer winding would be divided into twenty-four equal parts to cover a seventy-two decibel range in three decibel steps. Three decibels correspond to a voltage ratio of 1.41:1. Linear arithmetic interpolation would give a value of 1.205 at the midpoint (1.5 decibels) whereas the true reading at the midpoint of 1.5 decibels would be 1.185, an error of approximately 1.7 percent. This error increases very rapidly as the equivalent decibel spacing between taps is increased and is approximately 5 percent for six decibel tap spacing. Since the cost of manufacture depends to a very great extent on the number of tap points or leads required, it is very desirable and is an important advantage to decrease the number of taps on both the potentiometer and the voltage dividig means, which usually will take the form of a toroidal transformer. It is the use of the loading resistor which permits accurate interpolation even when the tap points have a relatively wide decibel spacing and an even more accurate interpolation when the decibel spacing is reduced.

Thus, with the loading resistor, it has been found possible to interpolate the logarithmic function between tap points six decibels apart to an accuracy of 0.05 decibel or approximately 0.6 percent by choosing the correct loading resistor. Even greater accuracy is obtained when the tap points have a smaller decibel spacing. For example, a two decibel spacing can give a conversion error of less than 0.02 percent. On the other hand, the optimum loading function and maximum interpolation error will increase with decibel spacing, becoming greater than one decibel or 10 percent with twenty decibel tap separation. It has been found that a tap separation between three and twelve decibels, depending on the required accuracy, would appear to be a reasonable range. Thus, it is apparent that there must be a balance struck between accuracy and cost of manufacture. As the decibel spacing increases, the cost of manufacturing decreases, but the accuracy also decreases. Conversely, as the decibel spacing is decreased, the accuracy increases. For most applications, it will be found that a tap separation between three and twelve decibels, depending on the required accuracy, is feasible. A six decibel spacing now appears to be the best and most economical choice for most intended uses although, for example, extremely accurate A.C. voltmeters may require either a closer spacing or the use of certain compensating procedures as discussed below.

Figure 1:
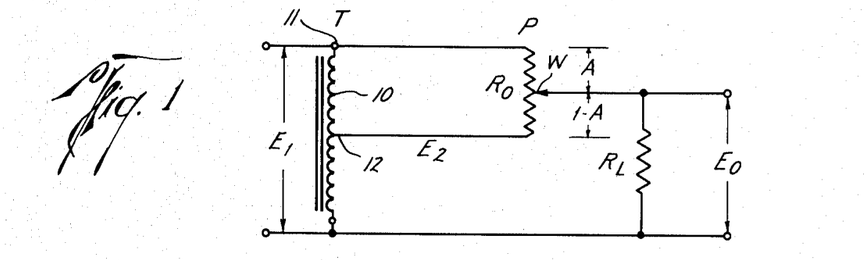
FIG. 1 is a schematic which will be used to illustrate the principle involved in the invention.

Thus, referring to FIG. 1, the voltage dividing means is illustrated as including a transformer winding 10 which preferably is the winding of an autotransformer T. The autotransformer is also preferably wound on a toroidal core; and for the six decibel spacing, it is shown wound with a turns ratio of 2:1, thereby yielding a six decibel ratio in voltage between the voltages $E_1$ and $E_2$. The autotransformer is provided with an input terminal 11 and intermediate terminal 12. A linear potentiometer P is connected across these two terminals and is provided with a wiper W. In the figure, the letter "A" denotes the fraction of total angular travel of the potentiometer wiper W to yield a wiper voltage $E_0$ and A will thus vary from 0 to 1.0. For simplification of this explanation, the six decibel spacing will be considered as a 2:1 turns ratio, the error being only about ¼ percent or .025 decibel. Of course, in any actual construction, the exact ratio of 1.99526 will be used in actual design computations, or alternatively, the turns ratio can be exactly 2:1 and the decibel spacing considered as 6.0206 when calibrating the voltage readout device.

An analysis of the loop currents in the circuit of FIG. 1 gives the following equation:

$$\frac{E_1}{E_0} = \frac{1 + \frac{R_0}{R_L}(A - A^2)}{1 - A + \tfrac{1}{2}A} \quad (1)$$

The ideal relationship between $$\frac{E_1}{E_0} \text{ and } A$$

is given by:

$$A = \frac{(20)}{6} \log_{10} \frac{E_1}{E_0} \quad (2)$$

or:

$$\left(\frac{E_1}{E_0}\right) = 10^{0.3A} \quad (3)$$

If Equation 3 is substituted into Equation 1 with $A=0.5$, for zero error at that point, the solution for the ratio of $R_0/R_L$ is found to be 0.241 or:

$$R_L = 4.15 R_0 \quad (4)$$

Equation 1 then becomes:

$$\frac{E_1}{E_0} = \frac{1 + 0.241(A - A^2)}{1 - \tfrac{1}{2}A} \quad (5)$$

Therefore, in accordance with the foregoing computations, the value of the loading resistor $R_L$ is 4.15 times the incremental resistance between the taps on the potentiometer P for a six-decibel spacing. The optimum ratio of $R_0/R_L$ for other decibel spacings can be readily calculated in a similar fashion. In general, the loading resistor should be of sufficient magnitude as to cause the output voltage from the wiper or contact to vary substantially in proportion to the anti-logarithm of the movement of the wiper or contact.

A general expression for the relation of the resistance ratio to the db spacing is given below:

$$\frac{R_0}{R_L} = 2 \frac{10^{\frac{db}{20}} + 1}{10^{\frac{db}{40}}} - 4 \quad (6)$$

where "db" in the exponents refers to the decibel spacing. The choice of the midpoint for zero error, i.e., with $A=0.5$ is not optimum but is very close to optimum for minimum average error. The value of the resistor "$R_L$" is not extremely critical especially for close db spacing. Selection to ±5% is adequate.

To illustrate the substantial decrease in interpolation error brought about by the addition of resistor $R_L$, let us assume that the arrangement of FIG. 1 is to be used in conjunction with a potentiometric rebalance servo-mechanism in which the voltage $E_0$ is compared with a reference voltage $E_R$, the difference or error voltage causing the servomechanism to drive the potentiometer wiper until $E_0 = E_R$. Stated in another way, the wiper will be moved so that as input voltage $E_1$ changes, $E_0$ will be held constant throughout the six-decibel interval. Then the angular error in A in the rest position of the wiper, as compared with the correct wiper position and with the corresponding decibel error, will be as follows:

| A | Error in A | Decibel error |
|---|---|---|
| 0 | 0 | 0 |
| .1 | −.005 | −.03 |
| .2 | −.007 | −.042 |
| .3 | −.006 | −.036 |
| .4 | −.0035 | −.021 |
| .5 | 0 | 0 |
| .6 | +.0038 | +.023 |
| .7 | +.0068 | +.041 |
| .8 | +.008 | +.048 |
| .9 | +.0063 | +.038 |
| 1.0 | 0 | 0 |

Figure 2:
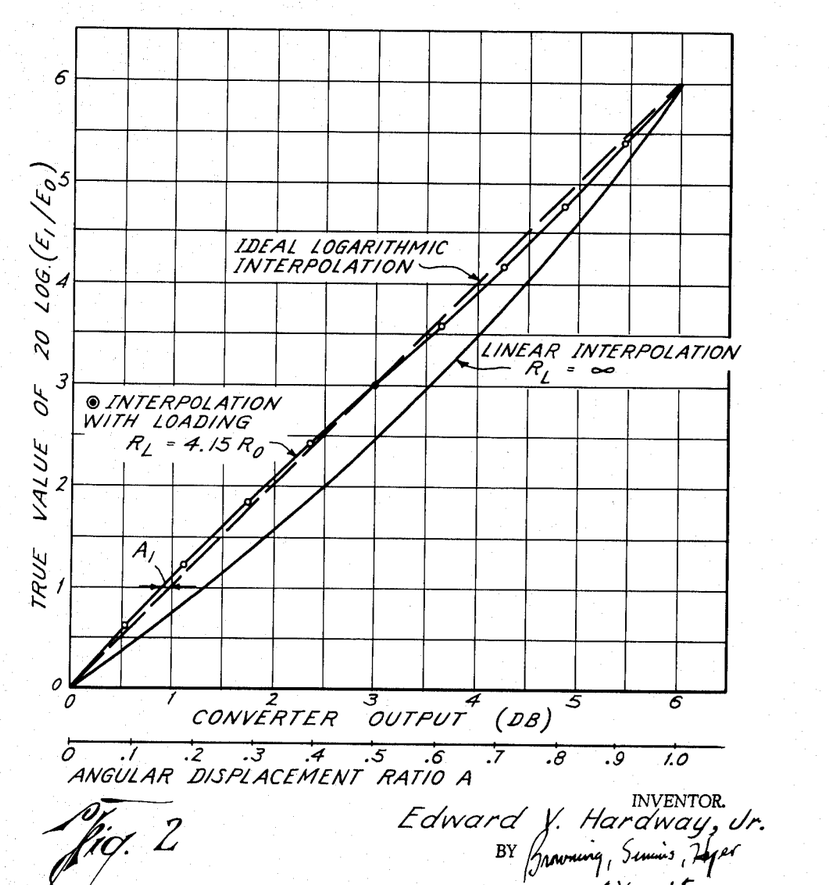
FIG. 2 is a plot, logarithmic on both axes, of actual results obtained using the circuit of FIG. 1 and shows the actual converter output in decibels relative to the ideal or theoretical output and also illustrates the magnitude of the errors involved when the loading resistor of FIG. 1 is omitted.

The maximum error is thus +0.048 decibel or less than 0.6 percent in the six-decibel range. A plot is given in FIG. 2 showing the ideal straight line function (calculated), the function resulting when the loading resistor $R_L$ is absent ($R_L$ equal to infinity) and the very close approximation described above using a loading resistor $R_L = 4.15 R_0$. It will be noted that with the loading resistor $R_L$, there are three points which correspond exactly with the ideal function, i.e., one at each tap point at each end of the six-decibel potentiometer increment and one at the midpoint of such increment. On the other hand, it will be noted that the generated function without the loading resistor is precisely equal to the ideal function only at the tap points and at the midpoint, the error is more than 0.5 decibel.

It will be noted that the plot in FIG. 2 of the actual output versus the true values of $20 \log (E_1/E_0)$ is a curve which departs slightly from the ideal curve. Close inspection shows that the departure or error appears to approximate a sinusoidal function and a plot of error versus wiper displacement (A) from the above table confirms this. While the error or departure does not vary as an exact sinusoidal function, it is close enough thereto that a considerable further reduction in error can be achieved by imparting a sinusoidal component of movement to that of the wiper. For example, a sinusoidal error corrector used with a logarithmic converter having a 15-decibel tap spacing would reduce the error from a maximum of 8.2 percent to 1 percent. Such a converter could take the form of a 15 turn helical potentiometer with one tap per turn to give a total decibel range of 75 decibels. The sinusoidal error corrector could comprise a sheave eccentrically mounted on the potentiometer shaft with the eccentricity being sufficient to approximate the sinusoidal error pattern. Thus, referring to FIG. 2, the eccentricity would be such that for the converter output from 0 to 3 decibels, the wiper position would be advanced from its normal position by an amount approximately equal to the horizontal distance between the actual and ideal curves. For example, the advance would be about $A_1$ at one decibel output. At the upper end of the range (3 to 6 decibel output), the wiper position would be retarded from its normal position. Thus, the sinusoidal corrector would cause the actual output to more closely approach the ideal. It should be noted that this technique would be most applicable where lower cost (with increased tap spacing) is a primary objective. This is demonstrated by the following table of maximum error which does not involve sinusoidal correction:

| db Spacing | Resistance ratio | Maximum error, percent |
|---|---|---|
| 1.00 | .006631 | .0022 |
| 2.00 | .026546 | .019 |
| 4.00 | .10651 | .16 |
| 6.00 | .24092 | .56 |
| 10.00 | .68113 | 2.6 |
| 15.00 | 1.5861 | 8.2 |

For 2 db spacing, the conversion error with the proper load resistance is .019% which compares favorably with the fact that the most accurate NBS A.C. standard is now rated at .05%. The accuracy of the approximation is not limited if the tap voltage ratio is correct. The load resistor permits a feasible number of taps for extreme accuracies without further correction.

The concept of this invention as described above in connection with FIGS. 1 and 2 can be extended by adding more turns and taps to the transformer winding, adding additional windings if required and adding additional sections of potentiometer winding each of resistance $R_0$. Thus, the problem of extending the range becomes primarily one of transformer design. This is easier and less costly to accomplish than is the extension of the decibel range of non-linear logarithmic potentiometers or diodes operating in temperature controlled ovens. Of even more importance, a highly accurate converter can be built with components manufactured through well known production techniques and the converter is not subject to significant changes with time, temperature or usage.

Figure 3:
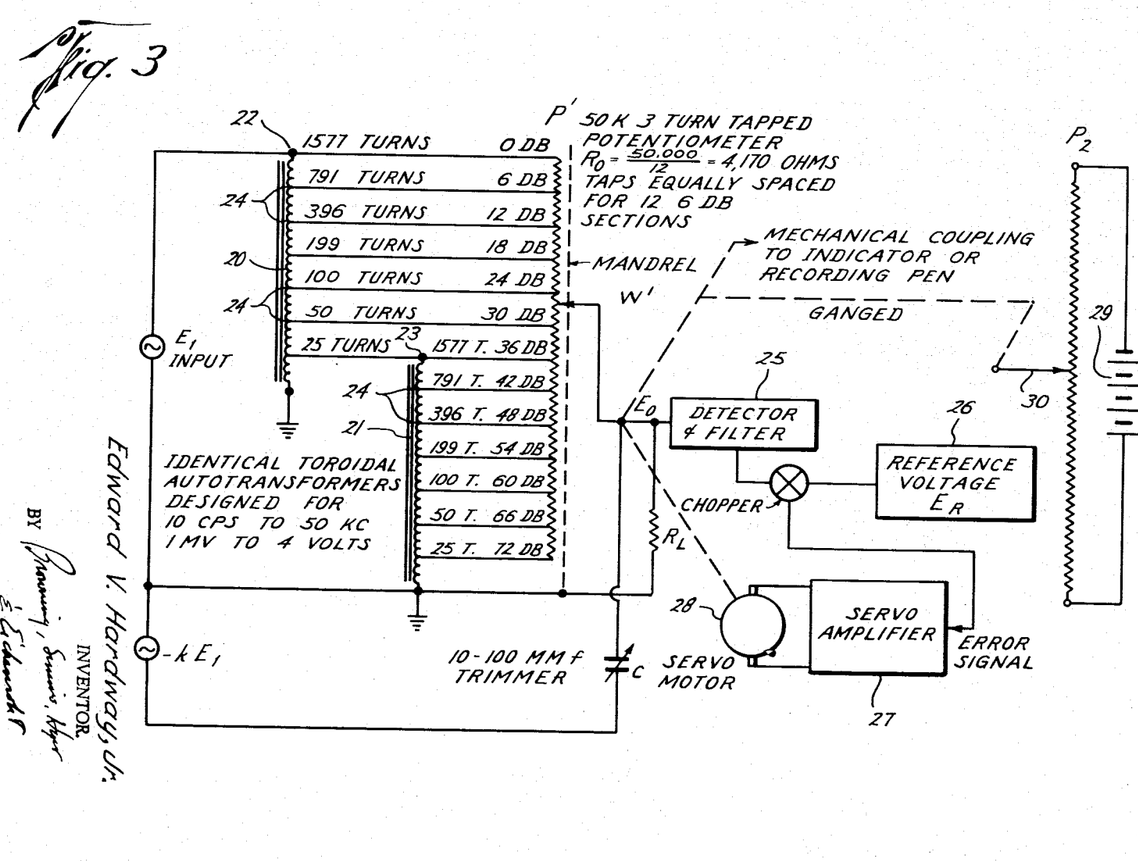
FIG. 3 is a schematic illustrating one preferred embodiment of the invention.

One extension of the above-described concept is illustrated in FIG. 3 which constitutes a preferred embodiment of the invention. In this figure, a pair of toroidal transformers 20 and 21 are each provided with input terminals 22 and 23 and each have their low end connected to ground as shown. Each transformer is also provided with a plurality of intermediate or output terminals 24 connected to the windings. The output terminals are so connected that the logarithm of the voltage differences between successive terminals are substantially equal to each other. Stated in another way, the output terminals are connected at intervals such that the ratio of the number of turns between successive output terminals is constant and is equal to the anti-logarithm of the number of decibels desired in each interval divided by 20. Thus, the particular transformers are illustrated for a six-decibel interval so the first intermediate or output terminal is located at 25 turns, the second at 50 turns, the third at 100 turns, etc. Since only even turns are practical in establishing voltage ratios, the largest decibel error occurs at the 100 turn output terminal and is 0.04 decibel. Increasing the total number of turns would reduce this error by making possible more exact ratios, but this would add to the cost of the toroid or transformer.

In order to provide a broad decibel range while at the same time maintaining the total number of turns within practical limits, two transformers are connected as shown in FIG. 3. That is, the input terminal 23 of transformer 21 is connected to one of the output terminals of transformer 20; that is, to the output terminal at 25 turns. As a result, for the 72 decibel spread in six-decibel steps as shown in FIG. 3, two transformers each having 1,577 turns can be employed. If only a single transformer is employed with this decibel spread, it will require nearly 100,000 turns for the same turns ratio accuracy. The cost would be much greater and the increased winding capacity and resistance would reduce the accuracy and limit the high frequency response for the 72 decibel toroid. An alternate method to that described is to use odd decibel division for even turns ratios as previously mentioned. The cost of two toroids is not significantly greater than one, if the total number of accurately spaced taps is the same.

A linear potentiometer P' is provided in FIG. 3 with a plurality of taps which are connected to the corresponding outlet terminals of the two transformers to provide the six-decibel spacing between the taps on the potentiometer. Here again, a wiper W' is provided and a loading resistor $R_L$ is electrically connected between the wiper W' and a fixed voltage point, such as the lower end of the transformer or ground. The relationship between $R_0$, $R_L$ and $E_2$ is identical to that shown in FIGS. 1 and 2. The tap above the wiper at any position may be considered to be at the voltage $E_1$ and the tap below it at $E_2$ since throughout the range, the voltage ratio between any two adjacent taps is six-decibels or approximately 2:1.

An important concept in this invention is that since a log function involves a substantially fixed ratio of turns or voltage between any two successive tapped increments on the transformer and since equal resistive spacing is used between potentiometer taps, the same loading function and loading resistor may be used throughout the range. In other words, it was discovered that the necessary corerctive action of $R_L$ is equally effective between any two selected taps on the potentiometer and its value need not be changed as the wiper moves from one end of the potentiometer to the other.

The metal mandrels in multi-turn potentiometers are normally ungrounded and at high frequencies, they assume a potential of about half the maximum winding potential due to their capacity coupling with the resistive winding. In the configuration shown, it is desirable to ground the mandrel which, for high level inputs, will assume a potential hundreds of times greater than the resistance wire wrapped around it at the wiper. (In practice, the effect of an ungrounded mandrel becomes apparent above 5 kilocycles.) Since the voltage at one end of the potentiometer winding can be up to three to four thousand times greater than the wiper voltage, capacity coupling of even one micromicrofarad or less will cause the voltage at the wiper to rise above the desired level when the wiper is between taps. A small neutralizing capacitor C between an oppositely polarized voltage $(-kE_1)$ and the wiper greatly reduces this effect, making the combination substantially insensitive to frequency up to 20 kilocycles and usable up to 100 kilocycles.

From Equation 2 above, it will be seen that the position of the wiper W' along the potentiometer is a function of the logarithm of the ratio of the input voltage $E_1$ to the output voltage $E_0$. By moving the wiper so that $E_0$ remains constant for varying input voltages, the position of the wiper then becomes a logarithm of this ratio. While this positioning of the wiper can be achieved in any desired manner, even manually, a potentiometric servomechanism is shown in FIG. 3. Thus, the voltage $E_0$ can be detected and filtered by the detector and filter 25 and compared with a reference voltage $E_R$ from source 26, the error voltage being amplified by servoamplifier 27 and then applied to control a servomotor 28 connected to the wiper W'. As a result, the wiper W' is driven to balance so that $E_0 = E_R$. The wiper can be linked either mechanically or electrically to any suitable indicator or recording device. Thus, it will be apparent that the potentiometer shaft and any indicating device or recording pen coupled thereto will be caused to move through a displacement proportional to the ratio of $E_1$ to $E_R$ expressed in decibels.

A second potentiometer $P_2$ can be provided to yield an output voltage proportional to the decibel changes in the input voltage $E_1$ relative to the reference voltage $E_R$. Thus, the potentiometer $P_2$ has a voltage source 29 connected across it and its wiper 30 is ganged to wiper W'. Accordingly, the voltage of the wiper 30 will be proportional to and a function of the position of the wiper W' and therefore, a function of the ratio $E_1$ to $E_R$ expressed in decibels.

In designing the system shown in FIG. 3, it is desired that the transformer be driven by a low impedance source such as a cathode follower. Also, the resistance between taps on the potentiometer P' should be high relative to the resistance between taps on the transformer windings. For example, the resistance $R_0$ between taps on the potentiometer might be from 3,000 to 10,000 ohms whereas the toroid tap output impedance would be very low in comparison, say less than ten ohms. The loading effect on the transformer is thus extremely small and can, if necessary, be corrected further by trimming resistances of high values, shunting the transformer taps to ground.

The operation of the embodiment shown in FIG. 3 should be apparent, but a short description will be given. Thus, for any given input voltage $E_1$, the servomechanism will position the wiper W' until the wiper voltage is equal to the reference voltage $E_R$. Then should the input voltage increase, the resulting tendency of wiper voltage to increase will cause the servomechanism to move the wiper toward the lower end of the potentiometer until $E_0 = E_R$ again. This new position of the wiper W' will be proportional to the ratio of the increased $E_1$ to $E_R$ expressed as decibels. Further variations in the input voltage will cause the wiper W' to be moved up and down the potentiometer scale, thereby continuously providing an output reading in decibels.

Figure 5:
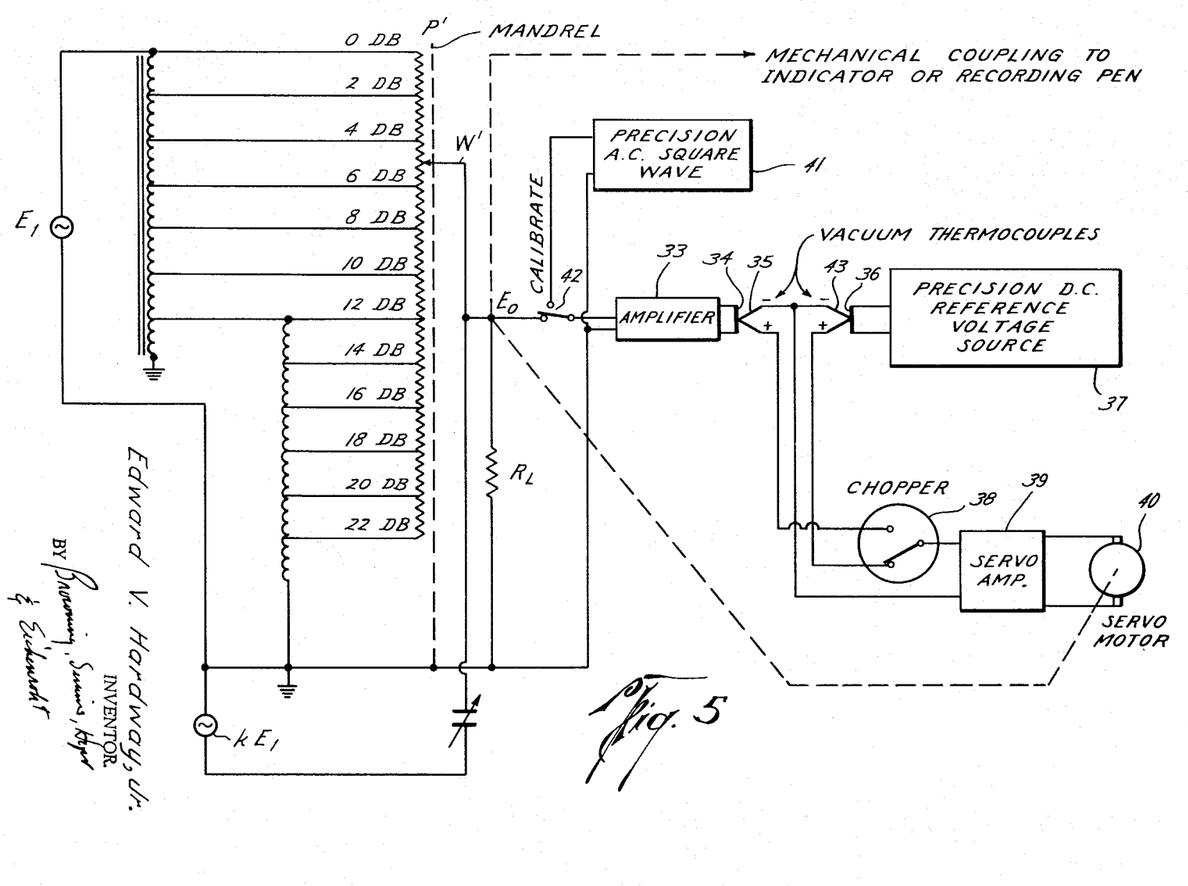
FIG. 5 illustrates another embodiment of the invention which is particularly adapted to very accurately measure A.C. voltages.

FIG. 5 shows an embodiment which is somewhat similar to that of FIG. 3 except that it is more refined and illustrates a form which permits extremely accurate A.C. voltage measurements. Before turning to the description of FIG. 5, it should be pointed out that nearly all A.C. measurements below 0.5% accuracy and all A.C. calibration work below 1% accuracy are carried out with expensive thermal transfer standards. Thermal transfer standards are normally supplied with a multiplicity of thermal converter units, one for each limited voltage range. Each measurement made with a thermal transfer standard is a difficult and time consuming procedure. An unknown A.C. voltage is applied to the heating element of a vacuum thermocouple in the thermal converter and the D.C. output of the thermocouple is measured with a precision D.C. potentiometer. A variable D.C. voltage which can also be precisely measured is then applied to the heating element and is varied until the thermocouple output voltage is precisely equal to that output produced by the application of the unknown A.C. voltage. The true R.M.S. or heating value of the unknown A.C. voltage is then known to be equal to the substituted D.C. voltage. The ambient temperature surrounding the thermocouple is held constant by an oven or other means of compensation are employed. The basic reasons for employing this substitution technique are, first, that the precise measurement of D.C. voltages is a much more highly developed art than is the accurate measurement of A.C. voltages and second, vacuum thermocouples or thermal converters are nonlinear devices responsive to A.C. or D.C. inputs, each with individual characteristics but with excellent repeatability. An extremely accurate logarithmic converter made in accordance with this invention and manually or servo driven would provide a constant A.C. output voltage to feed the thermocouple heater regardless of the level of the unknown A.C. voltage within the converter's range. Such a converter in combination with vacuum thermocouple (as in FIG. 5) or suitable detector (R.M.S., average value or peak value, depending on the nature of the measurement) (as in FIG. 5) would eliminate the need for the substitution procedure previously described. This combination, when used with a D.C. servomechanism in which the thermocouple output is compared with a precise D.C. reference voltage to provide the servo actuating error signal, would provide a self-balancing A.C. standard voltmeter with accuracies previously unattainable in A.C. indicating instruments. The measurement could be made from an indicator and scale coupled to the logarithmic attenuator wiper with constant readability anywhere on the logarithmic scale. With a logarithmic attenuator servo loop gain is constant. The time required for a measurement would be a small fraction of that now require with thermal transfer standards.

Referring now to FIG. 5, the autotransformer-linear potentiometer arrangement is similar to that shown in FIG. 3 except that a closer decibel spacing is used to achieve greater accuracy. Here, the spacing is 2 decibels and this should result in a maximum error of 0.019%. The voltage from wiper W' is fed to an amplifier 33 and the amplified A.C. signal is then applied across vacuum thermocouple heater wire 34. This produces a voltage across the thermocouple 35 which varies with the R.M.S. heating value of the A.C. signal. At the same time, an accurately known D.C. reference voltage is applied to the heater wire 36 of another vacuum thermocouple from a precision D.C. reference voltage source 37. Again, a voltage differential will be developed across thermocouple 43 proportional to the heating value of the D.C. reference voltage. The two vacuum thermocouples are hooked in bucking relationship as shown and their outputs are fed to a chopper 38 and thence to a servoamplifier 39 for comparison therein. The servoamplifier controls a servomotor 40. The servomotor is linked to the wiper W' so that any voltage difference between the two outputs from the two thermocouples will cause the servomotor to drive the wiper to change the A.C. voltage until its heating value equals that of the D.C. reference, i.e., the wiper is driven to a null point. At the same time, the servomotor can drive a large dial or recorder which can be calibrated to read in A.C. volts or in any other desired indicia.

The foregoing arrangement has several advantages. In the first place, it must be particularly emphasized that the system maintains the A.C. voltage input to its vacuum thermocouple a constant value, thereby permitting the vacuum thermocouple to work at one point. This eliminates problems of non-linearity and compensation therefor, problems of varying loop gain which might ordinarily require an A.G.C. preamplifier and affords equal accuracy anywhere on the readout scale.

If desired, a precision A.C. square wave source 41 can be used in conjunction with a calibrate switch 42 for calibrating the system.

It will normally be desired that the transformer windings be wound as toroidal autotransformers although it will be apparent that other means, such as ordinary transformers with isolated primary and secondary windings, can be used to divide the input voltage into the predetermined decibel levels. The potentiometer will likewise be preferably wound in a multi-turn helical form, although any form of precision potentiometer may be used.

While in many cases it is preferred that the reference $E_R$ be fixed in value, it can also be varied. For example, if a system under test is driven from an oscillator with varying output voltage, it should be desirable to detect the oscillator output and derive $E_R$ from it to determine the true ratio in output to input in decibels of the device under test without regard to undesired changes in the oscillator voltage. Similarly, the voltage $-kE_1$ used for neutralizing can be derived from within the amplifier driving the transformer or from an extra winding on one of the transformers. The trimmer capacitor C is adjusted to minimize positive capacity coupling to the wiper between the first two or three tap points from the bottom. The trimmer capacitor is not needed at low frequencies.

D.C. input signals and slowly varying A.C. input voltages may be converted with the system shown in FIG. 3 if these signals are first modulated. If, for example, a sixty-cycle chopper were used followed by an amplifier or cathode follower, sixty cycles per second square waves would be transmitted through the converter and could be detected in similar manner. Low frequencies, say below ten cycles per second, may be chopped and passed through the converter as a sixty-cycle suppressed carrier signal. Full wave detection is preferred to reduce the filtering problem and greatly reduce beats as the signal frequency approaches subharmonics and harmonics of sixty cycles. Sixty cycles and harmonics of sixty cycles should be greatly attenuated by the filter.

The apparatus shown in FIG. 3 has shown capabilities of usage over a range from below ten cycles per second to above 20,000 cycles per second and an amplitude range of 72 decibels or almost 4000:1 with better than 1 percent accuracy expressed as a percent of the input to output voltage ratio throughout the range. It is adaptable to computer use and to recorders with logarithmic pen motion. It makes practical the design of wide range logarithmic A.C. and D.C. voltmeters where several decades are presented on one scale. The latter type of instrument will offer greater advantages in the elimination of scale switching transients and in reduced computation time, especially if it is provided with a manually movable zero decibel reference scale.

Figure 4:
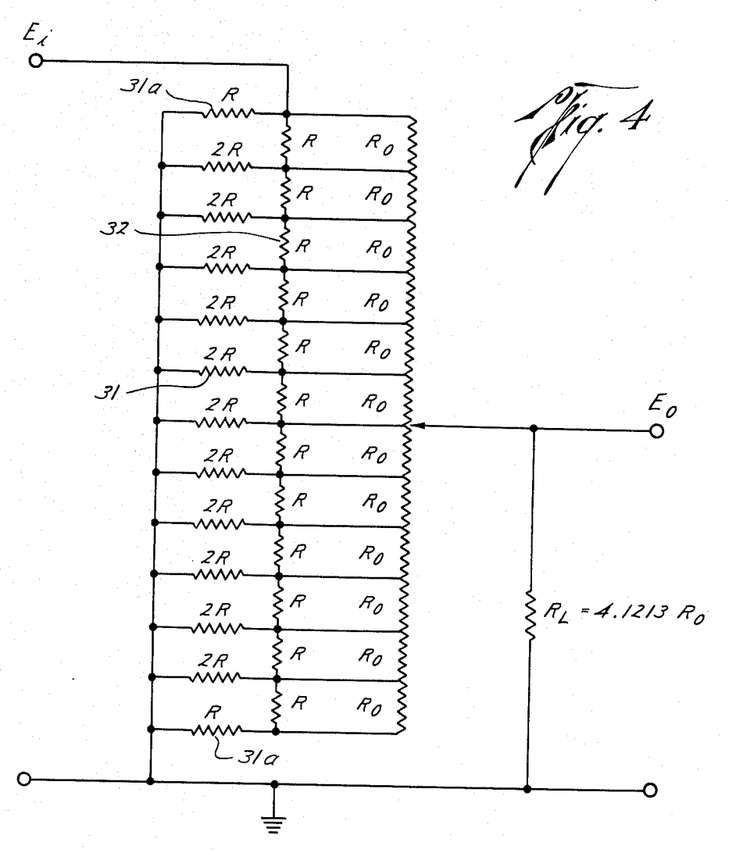
FIG. 4 is a schematic illustrating another embodiment employing all resistive elements.

Referring now to FIG. 4, there is shown another means for dividing the input voltage into a plurality of sub or stepped voltages and for clamping the tap voltages on the linear potentiometer in a manner to provide selected but equal voltage ratios between successive taps. It will be noted that this means here comprises a resistive network rather than transformers as in FIGS. 1 and 3. Also, this network is shown to comprise only two values of resistors, i.e., R and 2R, to provide a voltage ratio of 2:1 between taps which is equivalent to a 6.0206 decibel spacing between taps. It will be noted that the tap to ground resistance is ⅔R at each tap.

This type of resistive network converter cannot achieve the extreme accuracy permitted by the use of the toroidal transformers as in FIG. 3 but in many instances, its accuracy will be sufficient for the contemplated use provided $R_0$ is considerably greater than R. Normally, even with a high ratio of $R_0$:R, this resistive arrangement will be limited to use at low levels of voltage input or low ranges thereof.

Here again, there is a common load resistor $R_L$ which should have a relationship with $R_0$ as set forth in the above formulae.

While the resistive network of FIG. 4 has been shown for a 2:1 voltage tap ratio, other tap ratios can be achieved with resulting other decibel spacing by changing the ratio of the resistances 31 to 32.

Also, the 2R resistors as well as the R resistors 31a can be eliminated, in which event the R resistors 32 will be of different values such as to give the desired stepped voltages as aforesaid. For example, the successive resistors might have values of 10, 10, 20, 40, 80, 160, etc. ohms for 6.0206 decibel tap spacings. This, of course, will not be as convenient as using only two values of resistors as in FIG. 4.

Alternatively, a hybrid arrangement may be used by employing an autotransformer 20 as in FIG. 3 in combination with a resistive network replacing autotransformer 21 so that the transformer and resistive network together comprise the means for dividing the input voltage into a plurality of sub or step voltages and for clamping such voltages in desired ratio on the successive taps of the potentiometer. For example, a transformer 20, as in FIG. 3, with a relatively few taps can be used to lower the driving impedance to the low value resistor network for the remainder of the voltage division. In such an arrangement, six of the 2R, R and $R_0$ combinations would be eliminated from the FIG. 4 network (essentially using only one half of the network) to still provide a 72 decibel range.

Alternatively, the transformer 21 could be replaced with a string of resistors having values, from bottom to top, of 10, 10, 20, 40, 80, 160 and 320 ohms with taps to the potentiometer being taken between resistances. The output impedance of the autotransformer 20 is extremely low at the bottom tap, being about $(25)^2/(1577)^2$ times the resistance of the source impedance of $E_1$. The maximum source impedance of the resistive divider is at the tap between the 160 and 320 ohm resistors and is 160 ohms. Since in this case, the resistance of each section is 4170 ohms and the value of $R_L$ is 17,300 ohms, the resulting error at each tap point is less than 2% without trimming the resistive divider.

It is therefore seen that the only essential is that the tap points on the linear potentiometer be clamped to the proper voltage ratios and that the load resistor $R_L$ be in proper ratio to the resistance $R_0$ between tap points so that the potentiometer is loaded so that its output curve approaches matching the ideal output curve and one value of $R_L$ serves for the entire range.

This application is a continuation-in-part of my copending application, Serial Number 109,776, filed May 12, 1961, now abandoned.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A logarithmic converter comprising a linear resistance having a plurality of substantially equally spaced taps, means for dividing an input voltage into a plurality of stepped voltages such that logarithms of successive stepped voltages relative to the input voltage differ by a substantially equal amount, means electrically connecting said dividing means to said resistance such that said stepped voltages are respectively applied to said taps, a contact movable along said linear resistance, and a loading resistance electrically connected between said contact and a fixed voltage point and of sufficient magnitude that the position of the contact between said taps is substantially a linear function of the logarithm of the ratio of the input voltage to the voltage of said contact.

2. The converter of claim 1 wherein the dividing means is a transformer winding having taps spaced along its length such that turns ratio of successive winding increments yields voltages at levels of uniform decibel spacing apart.

3. The converter of claim 2 wherein the linear resistance is wound on a grounded core and wherein a neutralizing capacitor is connected between the contact and a source of voltage of polarity opposite to that of the contact.

4. The converter of claim 1 wherein the dividing means includes a plurality of resistors arranged in a voltage dividing network to provide a plurality of differing stepped voltage outputs of uniform decibel spacing apart.

5. The converter of claim 1 in combination with means for moving said contact along said linear resistance; means for comparing the contact voltage with a reference voltage, said comparing means comprising a pair of thermocouples, one of which is connected to be energized by the contact voltage and the other by said reference voltage, and means for determining any relative variation in the outputs between said thermocouples.

6. A logarithmic converter comprising a transformer winding having input terminals and a series of output terminals connected to the winding at substantially equal decibel spacings apart, a linear potentiometer having equally spaced taps along its length connected to respective ones of said output terminals and having a contact movable therealong, and a loading resistive impedance electrically connected between said contact and one end of said winding and of such size as to cause a substantially anti-logarithmic output as the contact means moves from one tap to another along the potentiometer.

7. A logarithmic converter comprising a linear potentiometer having a plurality of equally spaced taps, a transformer windings having input terminals and a plurality of intermediate output terminals connected to the winding to divide an input voltage into a plurality of stepped voltages such that the logarithms of successive stepped voltages relative to said input voltage differ by substantially equal amounts, said output terminals being respectively connected to the taps on the potentiometer so that the taps are clamped at the proper voltage to represent decibel levels varying by an equal amount from tap to tap, a wiper contacting the potentiometer, a loading resistance electrically connected between the wiper and one end of the winding and of a magnitude that the position of the wiper between taps is substantially a linear function of the logarithm of the ratio of the input voltage to the voltage of the wiper, and means for positioning the wiper so that the voltage thereof is maintained in a fixed relationship to a reference voltage whereby the position of the wiper is proportional to the logarithm of the ratio of the input to the reference voltage.

8. The converter of claim 7 wherein said positioning means includes a servomechanism having a pair of thermocouples one of which is connected to be energized by the wiper voltage and the other by a reference voltage, means for comparing the thermocouple outputs, and a servomotor connected to the wiper to move it, responsive to a relative variation between the thermocouple outputs, to a position such as to maintain the wiper voltage constant and thereby cause the thermocouples to operate at a fixed operating point.

9. The converter of claim 7 wherein the potentiometer is wound on a grounded mandrel in combination with a condenser electrically connected between the wiper and a source of voltage of a polarity opposite to that of the wiper.

10. A logarithmic converter comprising a linear potentiometer having a plurality of equally spaced taps, at least two autotransformers each having input terminals and a plurality of intermediate output terminals connected to the windings of the autotransformers to divide an input voltage into a plurality of stepped voltages such that the logarithms of successive stepped voltages relative to said input voltage differ by substantially equal amounts, the input terminal of the autotransformer being connected to one of the intermediate output terminals of the other autotransformer and the other output terminals of the autotransformers being respectively connected to the taps on said potentiometer, a contact movable along said potentiometer, and a loading resistance electrically converted between said contact and a fixed voltage point and of a size such that the position of the contact between said taps is substantially a linear function of the logarithm of the ratio of the input voltage to the voltage of said contact.

11. A logarithmic converter comprising a linear potentiometer having a plurality of equally spaced taps, a resistive network having input terminals and a plurality of output terminals connected to the network to divide an input voltage into a plurality of stepped voltages such that the logarithms of successive stepped voltages relative to said input voltage differ by substantially equal amounts, said output terminals being connected to the taps on the potentiometer so that the taps are at the proper voltage to represent decibel levels varying by an equal amount from tap to tap, a wiper contacting the potentiometer, a loading resistance electrically connecting the wiper to a point of fixed voltage and of a magnitude that the position of the wiper between taps is substantially a linear function of the logarithm of the ratio of the input voltage to the voltage of the wiper, and means for positioning the wiper so that the voltage thereof is maintained in a fixed relationship to a reference voltage whereby the position of the wiper is proportional to the logarithm of the ratio of the input to the reference voltage.

References Cited by the Examiner

UNITED STATES PATENTS

| | | |
|---|---|---|
| 2,572,545 | 10/1951 | Walker. |
| 2,749,036 | 6/1956 | Langworthy __________ 235—195 |
| 2,981,098 | 4/1961 | Antippas et al. _____ 235—193 X |
| 3,009,642 | 11/1961 | Spencer ____________ 235—197 |
| 3,042,307 | 7/1962 | Booth et al. _______ 235—197 X |
| 3,090,908 | 5/1963 | Mynall _____________ 323—79 |

MALCOLM A. MORRISON, *Primary Examiner.*